United States Patent [19]
Komaki et al.

[11] Patent Number: 5,105,224
[45] Date of Patent: Apr. 14, 1992

[54] DOCUMENT-PLATE-POSITION DETERMINING DEVICE

[75] Inventors: Susumu Komaki, Hyogo; Susumu Takehara, Osaka, both of Japan

[73] Assignee: Mita Industrial Co., Ltd., Osaka, Japan

[21] Appl. No.: 634,949

[22] Filed: Dec. 26, 1990

Related U.S. Application Data

[63] Continuation of Ser. No. 391,875, Aug. 9, 1989, abandoned.

[30] Foreign Application Priority Data

Aug. 10, 1988 [JP] Japan ................. 63-200439

[51] Int. Cl.$^5$ ............................................ G03G 15/00
[52] U.S. Cl. ........................................ 355/230; 355/75
[58] Field of Search ............. 355/231, 75, 76, 230

[56] References Cited

U.S. PATENT DOCUMENTS 4,128,334 12/1978 Yanagawa et al. ................. 355/75
4,585,329 4/1986 Landa ............................. 355/75 X Primary Examiner—R. L. Moses
Attorney, Agent, or Firm—Koda and Androlia

[57] ABSTRACT

A document-plate-position determining device in which an actuator, for instance, projects from an upper body of a clam-shell shaped image forming apparatus with the movable document plate toward the document plate when the upper body is opened, and the information signal is uttered by movement of the document plate to the fixed position on the upper body due to interference of the actuator projected from the upper body with the protrusion formed beneath the under face of the document plate moving on the upper body.

1 Claim, 3 Drawing Sheets

DOCUMENT-PLATE-POSITION DETERMINING DEVICE

This is a continuation of application Ser. No. 391,875, filed Aug. 9, 1989, now abandoned.

BACKGROUND OF THE INVENTION

1. Field of the Invention

The present invention relates to a clam-shell shaped image forming apparatus with a movable document plate, particularly to a plate-position determination device setting the position of the document plate to the fixed position on an upper body of the apparatus when the upper body is opened.

2. Description of the Prior Art

A copying machine will be shown in FIG. 2 (a) and ibid. (b) as an example of the above-said kind of the image forming apparatus. When an upper body 2 of the copying machine will be opened in the direction of the arrow 3 from a lower body 1 as the standard, a document plate 6 provided movably toward the arrow 4, 5 on the upper body 2 must have been moved to the fixed position on the upper body 2 in advance, i.e., an edge portion 6a of the document plate 6 must have been in the area shown by the hatching 7 on the top face of the upper body 2.

But for the movement of the document plate 6 as mentioned above, a paper-feed section 8 or the document plate 6 might be damaged owing to the collision of the document plate 6 against the paper-feed section 8 installed at the side of the lower body 1 of the copying machine if the upper body 2 is opened and closed with the document plate 6 in a position except one fixed on the upper body 2. In addition, the document plate 6 might be damaged due to pressing down on its top face with operator's hand with the document cover therebetween.

Accordingly above-said copying machine should be comprised as the upper body 2 can be opened by means of the operation of the release lever (as not shown in Fig.) provided in a cover 9 only when the movement for the document plate 6 is fixed in position on the upper body 2 in advance.

As for the conventional copying machine as stated above, a position mark 10 forms at a position equivalent to the part shown by the hatching 7 on the top face of the upper body 2 below the under face of the document plate 6. So the document plate 6 finishes moving to the fixed position on the upper body 2 owing to the stop of the edge portion 6a of the document plate 6 at the position corresponding to the area of the position mark 10 after movement of it in the direction of the arrow 4 or the arrow 5 by an operator.

Now the document plate 6 should stop a the undefined position on the upper body 2 when there is a necessity for the upper body 2 to be opened in order that the jammed papers will be disposed after the paper jam occurs in the body of the copying machine. For example, the position mark 10 on the upper body 2 will become visible from the outside due to its exposure when the document plate 6 stops at the completion of movement in the direction of the arrow 5. Therefore an operator can make the document plate 6 move easily to a position wherein the edge portion 6a corresponds to the area of the position mark 10.

However the operator cannot notice the position mark 10 from the outside owing to the covering of the document plate 6 over the position mark 10 on the upper body 2 in case that the document plate 6 will stop in the condition of completion of movement in the direction of the arrow 4..

So the operator puts the position mark 10 in the visible condition from the outside by making the document plate 6 move in the direction of the arrow 5 in the first place for the purpose of the movement of the document plate 6 to the fixed position on the upper body 2. Next the operator must align the document plate 6 with the fixed position on the upper body 2 by means of the movement of the document plate 6 in the direction of the arrow 4. For that reason, it causes a problem in that the handling during opening of the upper body 2 is very inconvenient with regard to the foregoing copying machine.

SUMMARY OF THE INVENTION

The present invention was made to solve the conventional problems as mentioned above.

It is hence the general object of this invention to provide a document-plate-position determining device which can make a document plate move to the fixed position on an upper body conveniently and surely in case that the document plate stops at any position on the upper body.

Therefore the present invention provides a document-plate-position determining device comprising: means for interfering which projects from an upper body of a clam-shell shaped image forming apparatus with a movable document plate toward the document plate when the upper body is opened; and means for providing an information signal about the movement of the document plate to the fixed position on the upper body due to interference with the means for interfering which projects from the upper body with the document plate on the upper body.

As for the document-plate-positional information device referring to the present invention, when the upper body of the image forming apparatus is opened, means for informing generates an information signal due to interference of the means for interfering projected from the upper body with the document plate. For these reasons, an operator can recognize conveniently the completion of the movement of the document plate to the fixed position on the upper body.

While the specification concludes with claims particularly pointing out and distinctly claiming the subject-matter of the invention, it is believed the invention will be better understood from the following description taken in connection with the accompanying drawings in which:

BRIEF DESCRIPTION OF THE DRAWINGS

FIG. 2 (b) is a view as in FIG. 2 (a) showing the document cover in the opening state on the document plate.

DETAILED DESCRIPTION OF THE PREFERRED EMBODIMENTS

Figure 1:
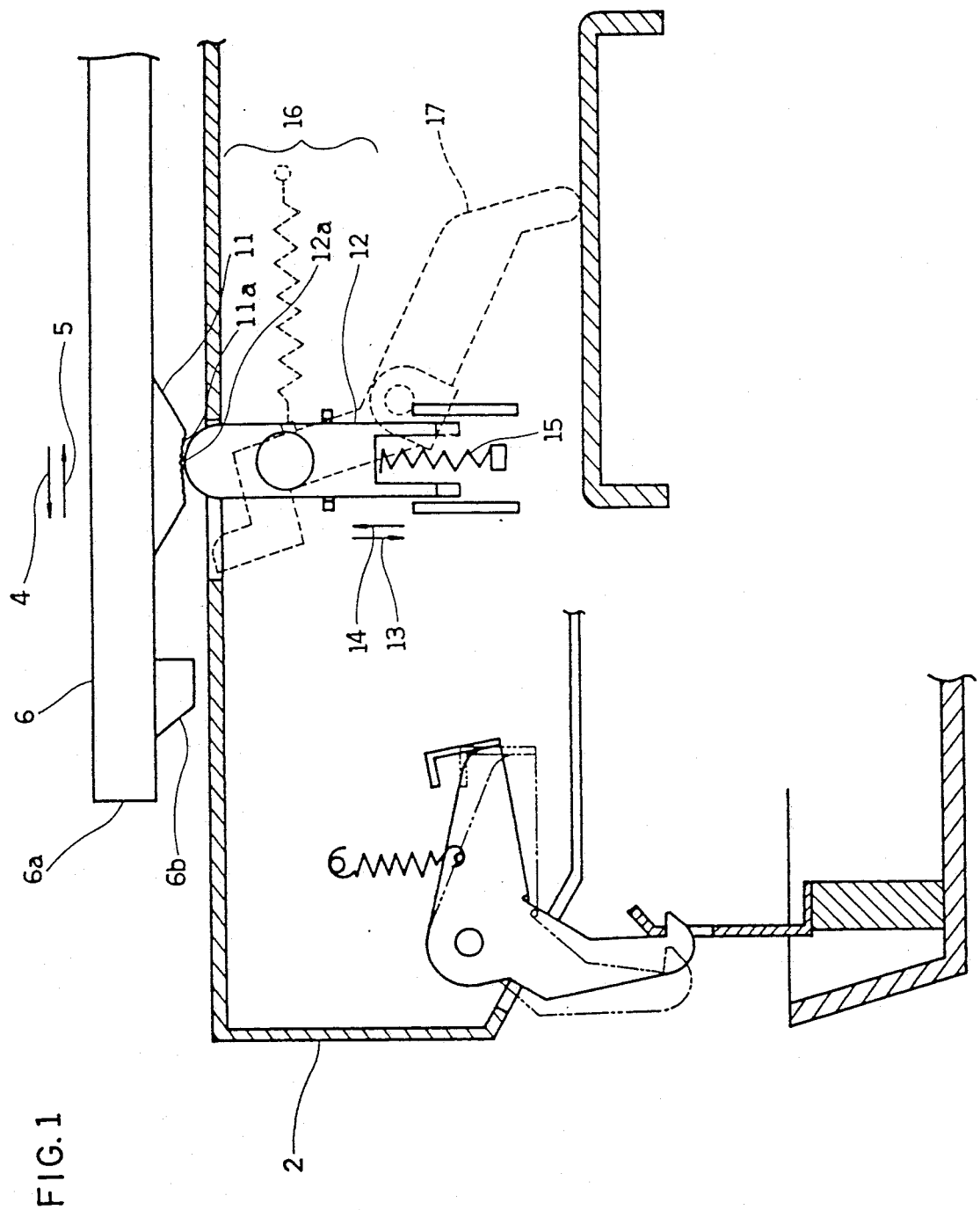
FIG. 1 is a vertical sectional view of a document plate-positional information device according to an embodiment of the present invention.

FIG. 1 is vertical sectional view of a document-plate position determining device according to an embodiment of the present invention.

In the document-plate-positional information device referring to the preferred embodiment as shown in FIG. 1, a document plate 6 is provided on the upper body 2 of a copying machine in the movable condition toward the arrow 4, 5. A protrusion 11 is installed beneath the under face of the document plate 6. And a irregular portion 11a is formed in the irregular continuous shape toward the arrow 4, 5 beneath the under face of the protrusion 11.

Figure 2A:
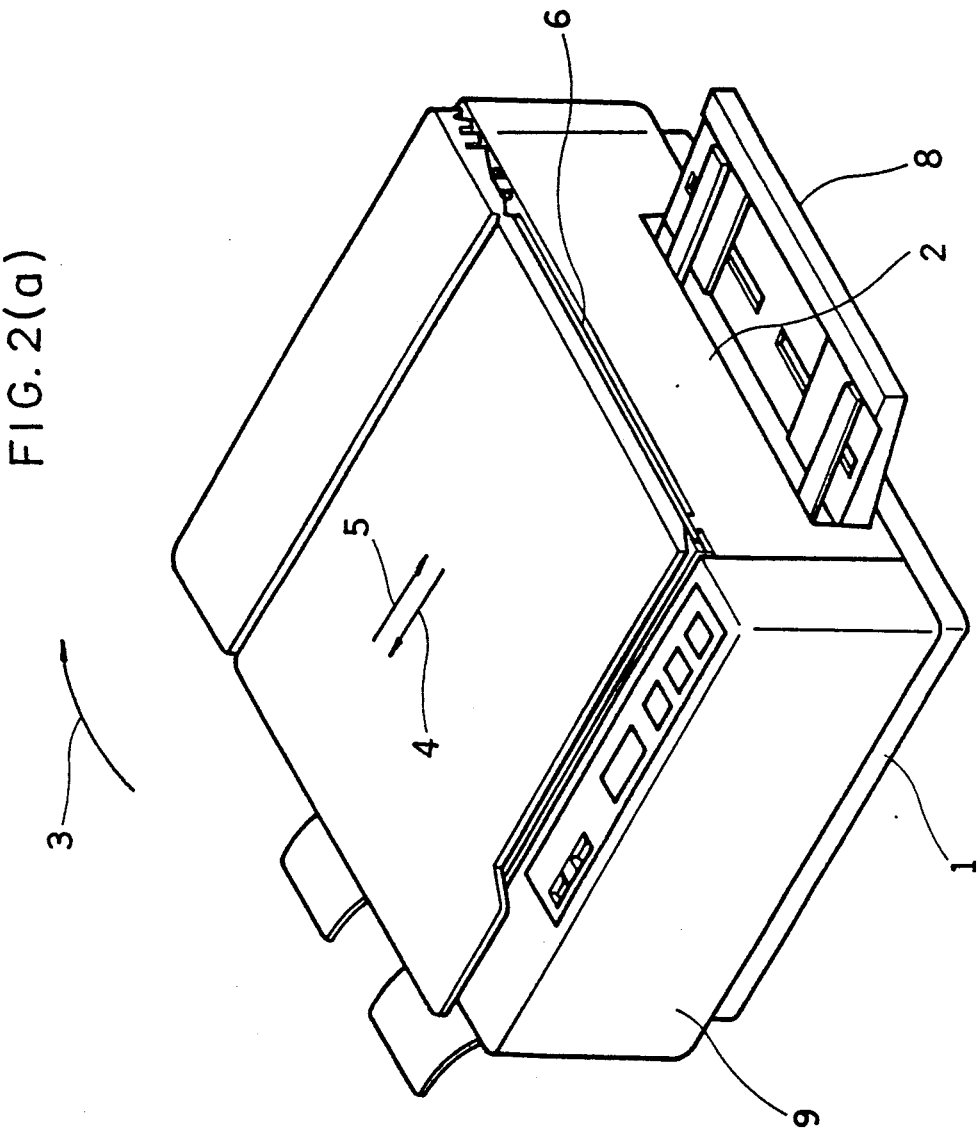
FIG. 2 (a) is a perspective side view of a clam-shell shaped copying machine with a movable document plate in the closing state of the document cover on the document plate as shown for the purpose of the explanation on the background of the present invention.
Figure 2B:
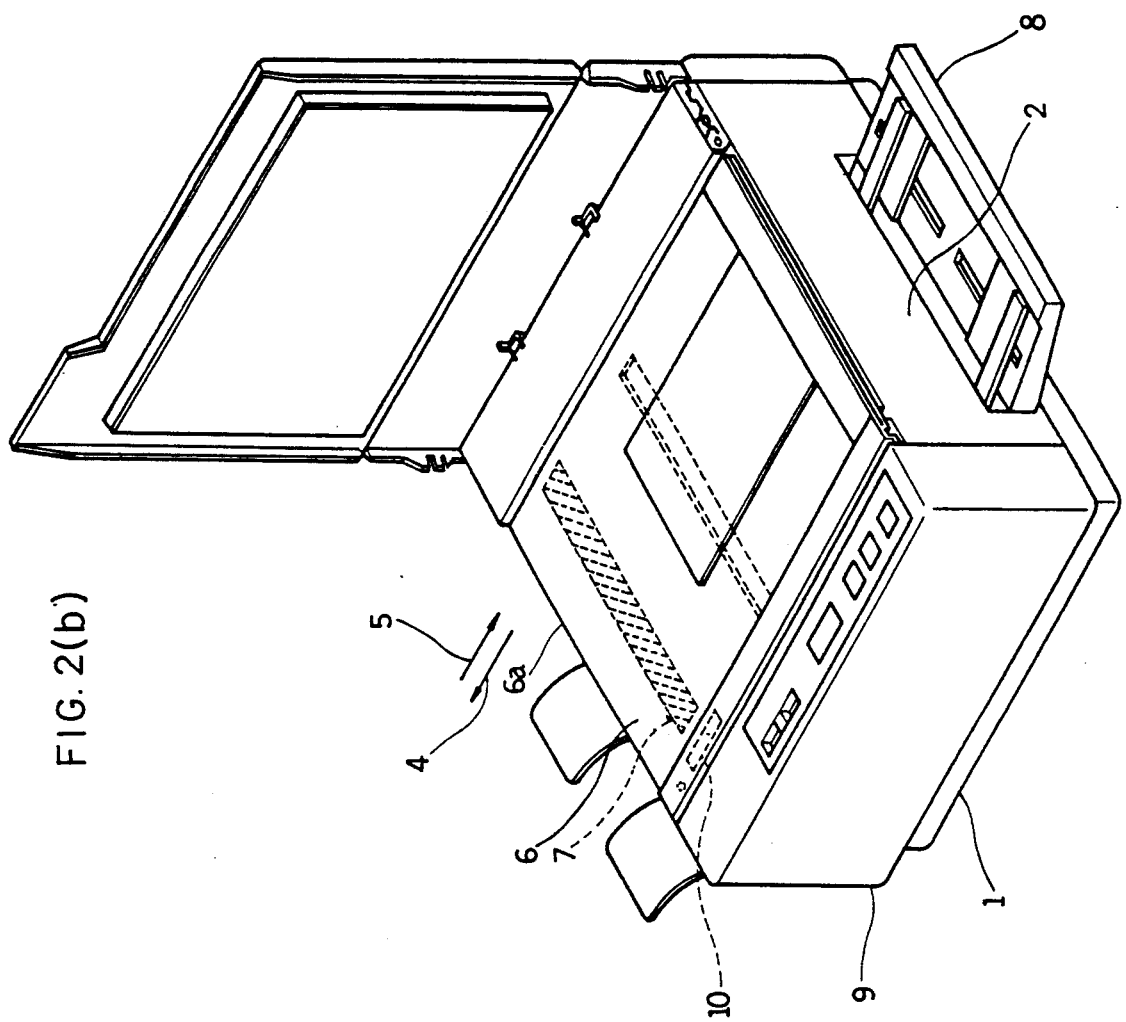

Moreover an actuator 12 is prepared as means for interfering in the slidable condition toward the arrow 13, 14 at the position of the upper body 2 below the under face of the document plate 6 corresponding to the position of the protrusion 11 in the state that the document plate 6 is at the fixed position on the upper body 2. The actuator 12 is always energized elastically toward the document plate 6 by means of a spring 15, and provides a function of projecting from the upper body 2 toward the document plate 6 only when a cover 9 of a copying machine (referring to FIG. 2 (a) and ibid. (b)) will be opened previous to the opening of the upper body 2. Therefore when a tip 12a of the actuator 12 is projected from the upper body 2 after the cover 9 opening interferes with the irregular portion 11a of the protrusion 11 of the document plate 6 moving on the upper body 2, the interfering sound is generated as the information signal from the contacting part of the irregular portion 11a of the protrusion 11 and the tip 12a of the actuator 12. So that an operator is informed that the document plate 6 has been moved to the fixed position of the upper body 2. As a result, the detection of the position of the document plate should be made at the fixed position on the upper body 2.

In the foregoing case, means for informing generates the information signal about the movement of the document plate to the fixed position on the upper body 2 is composed of the protrusion 11 and the actuator 12.

In addition in the figure, a reference sign 17 shows a claw catching a projection 6b installed beneath the under face of the document plate 6 at the time in opening of the upper body 2 in order to prevent the document plate 6 from sliding down from the upper body 2.

According to the document-plate-positional information device composed as mentioned above, for instance, in case that there is a necessity for the upper body 2 to be opened in order that the jammed papers will be disposed after the paper jam occurs in the body of the copying machine and in case that the document plate 6 stops at any position on the upper body 2, the interfering sound is generated by the contacting part of the tip 12a of the actuator 12 and the irregular portion 11a of the protrusion 11 if only the document plate 6 is moved on the upper body 2 after the projection of the actuator 12 toward the document plate 6 in succession of the cover 9 opening.

For that reason, an operator can notice easily the fixed position of the document plate 6 on the upper body 2. As a result, the operator can make the document plate 6 move conveniently and certainly to the fixed position on the upper body 2.

Besides, a document-plate-position determining device as varied from the foregoing embodiment can comprise a detector which is provided at the actuator 12 to detect the interference of the protrusion 11 and the actuator 12, and can electrically an alarm based on the detect signal from the detector or can display a comment about the interference in an operating panel of the copying machine.

In a document-plate-position determining device referring to the present invention as mentioned above, a document plate can be moved conveniently and certainly to the fixed position on an upper body stopped at any position on the upper body.

This invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embraced therein.

We claim:

1. A position determining device for a document plate of an image forming apparatus whose upper body is pivotally coupled to a lower body such that the upper body inclines relative to said lower body when the upper body is opened, said document plate being slidably mounted on an upper surface of said upper body along a direction of said inclination of said upper body when said upper body is opened, said device comprising:

a projection provided on an under surface of said document plate;

a claw on said upper body for engaging with said projection on said document plate only when said upper body is opened and for preventing the document plate from sliding in said direction of inclination when said upper body is opened by engagement with said projection on said document plate;

a protrusion provided on said document plate; and an actuator provided in said upper body which engages with said protrusion only when said upper body is closed, said actuator and protrusion being further respectively provided and positioned on said upper body and said document plate respectively such that when said actuator and protrusion are engaged, said projection is located upstream from said claw in said direction of inclination when said upper body is opened;

whereby engagement of said actuator with said protrusion when said upper body is closed insures that said projection is located upstream from said claw in said direction of inclination when said upper body is opened so as to prevent damage to said document plate and to prevent sliding off of said document plate from said upper body.

* * * * *